(12) United States Patent
Stancu et al.

(10) Patent No.: US 8,802,253 B2
(45) Date of Patent: Aug. 12, 2014

(54) WELD VALIDATION SYSTEM AND METHOD FOR A BATTERY MODULE

(75) Inventors: Janina Stancu, La Salle (CA); Kenneth J. Oswandel, Livonia, MI (US)

(73) Assignee: LG Chem, Ltd., Seoul (KR)

( * ) Notice: Subject to any disclaimer, the term of this patent is extended or adjusted under 35 U.S.C. 154(b) by 162 days.

(21) Appl. No.: 13/077,166

(22) Filed: Mar. 31, 2011

(65) Prior Publication Data

US 2011/0256430 A1    Oct. 20, 2011

Related U.S. Application Data

(60) Provisional application No. 61/324,996, filed on Apr. 16, 2010.

(51) Int. Cl.
| H01M 10/48 | (2006.01) |
| H01M 10/42 | (2006.01) |
| H01M 2/26 | (2006.01) |

(52) U.S. Cl.
CPC ............ H01M 10/4285 (2013.01); H01M 2/26 (2013.01); Y02E 60/12 (2013.01); H01M 10/486 (2013.01)
USPC .................................. 429/50; 429/90; 219/80

(58) Field of Classification Search
CPC . H01M 10/486; H01M 10/4285; H01M 2/26; Y02E 60/12
USPC ..................... 429/50, 90; 219/80, 86.24, 130; 228/120; 703/63; 320/119, 120, 130, 320/132, 134–136

See application file for complete search history.

(56) References Cited

U.S. PATENT DOCUMENTS

| 4,451,791 | A | | 5/1984 | Ostroff et al. |
| 4,485,959 | A | * | 12/1984 | Orlando et al. ............... 228/102 |
| 2007/0181547 | A1 | * | 8/2007 | Vogel et al. ................ 219/130.1 |
| 2009/0154048 | A1 | | 6/2009 | Jang et al. |

FOREIGN PATENT DOCUMENTS

KR    20000038817 A    7/2000

OTHER PUBLICATIONS

U.S. Appl. No. 13/073,033, filed Mar. 28, 2011 entitled Testing System and Method for Testing a Battery Cell.

* cited by examiner

*Primary Examiner* — Milton I Cano
*Assistant Examiner* — Ling R Zeng
(74) *Attorney, Agent, or Firm* — Buckert Patent & Trademark Law Firm, P.C.; John F. Buckert

(57) ABSTRACT

A weld validation system and method for a battery module are provided. The battery module has first and second battery cells and an interconnect member welded to first and second tabs of the first and second battery cells, respectively. The system includes a gripping device having first and second gripping fingers contacting the interconnect member. The system further includes a temperature sensor that generates a first signal indicative of a temperature of the interconnect member when a battery cycling device is discharging the battery module. The system further includes a computer that determines a first temperature value indicative of the temperature of the interconnect member based on the first signal.

13 Claims, 12 Drawing Sheets

WELD VALIDATION SYSTEM AND METHOD FOR A BATTERY MODULE

CROSS-REFERENCE TO RELATED APPLICATIONS

This application claims priority to U.S. Provisional Patent Application No. 61/324,996 filed on Apr. 16, 2010, the entire contents of which are hereby incorporated by reference herein.

BACKGROUND

In a battery module, one or more battery cell tabs may be welded to an interconnect member. If the weld joint between the battery cell tabs and the interconnect member does not have desired weld joint characteristics (e.g., a low impedance), the inventors herein have recognized that a relatively high temperature may be obtained at the weld joint during discharging or charging of the battery module.

Accordingly, the inventors herein have recognized a need for a weld validation system for a battery module.

SUMMARY

A weld validation system for a battery module in accordance with an exemplary embodiment is provided. The battery module has first and second battery cells and an interconnect member welded to first and second tabs of the first and second battery cells, respectively. The system includes a gripping device having first and second gripping fingers configured to contact the interconnect member. The system further includes a battery cycling device being electrically coupled to the battery module. The battery cycling device is configured to charge and discharge the battery module. The system further includes a temperature sensor disposed on one of the first and second gripping fingers. The temperature sensor is configured to generate a first signal indicative of a temperature of the interconnect member when the battery cycling device is discharging the battery module. The system further includes a computer configured to determine a first temperature value indicative of the temperature of the interconnect member based on the first signal.

A method for validating a weld joint of a battery module in accordance with another exemplary embodiment is provided. The battery module has first and second battery cells and an interconnect member welded to first and second tabs of the first and second battery cells, respectively. The method includes contacting the interconnect member previously welded to the first and second tabs of the first and second battery cells utilizing first and second gripping fingers of a gripping device. The method further includes discharging the battery module utilizing a battery cycling device electrically coupled to the battery module. The method further includes generating a first signal indicative of a temperature of the interconnect member utilizing a temperature sensor when the battery cycling device is discharging the battery module. The method further includes determining a first temperature value indicative of the temperature of the interconnect member based on the first signal utilizing a computer.

These and other advantages and features will become more apparent from the following description taken in conjunction with the drawings.

DETAILED DESCRIPTION

Figure 1:
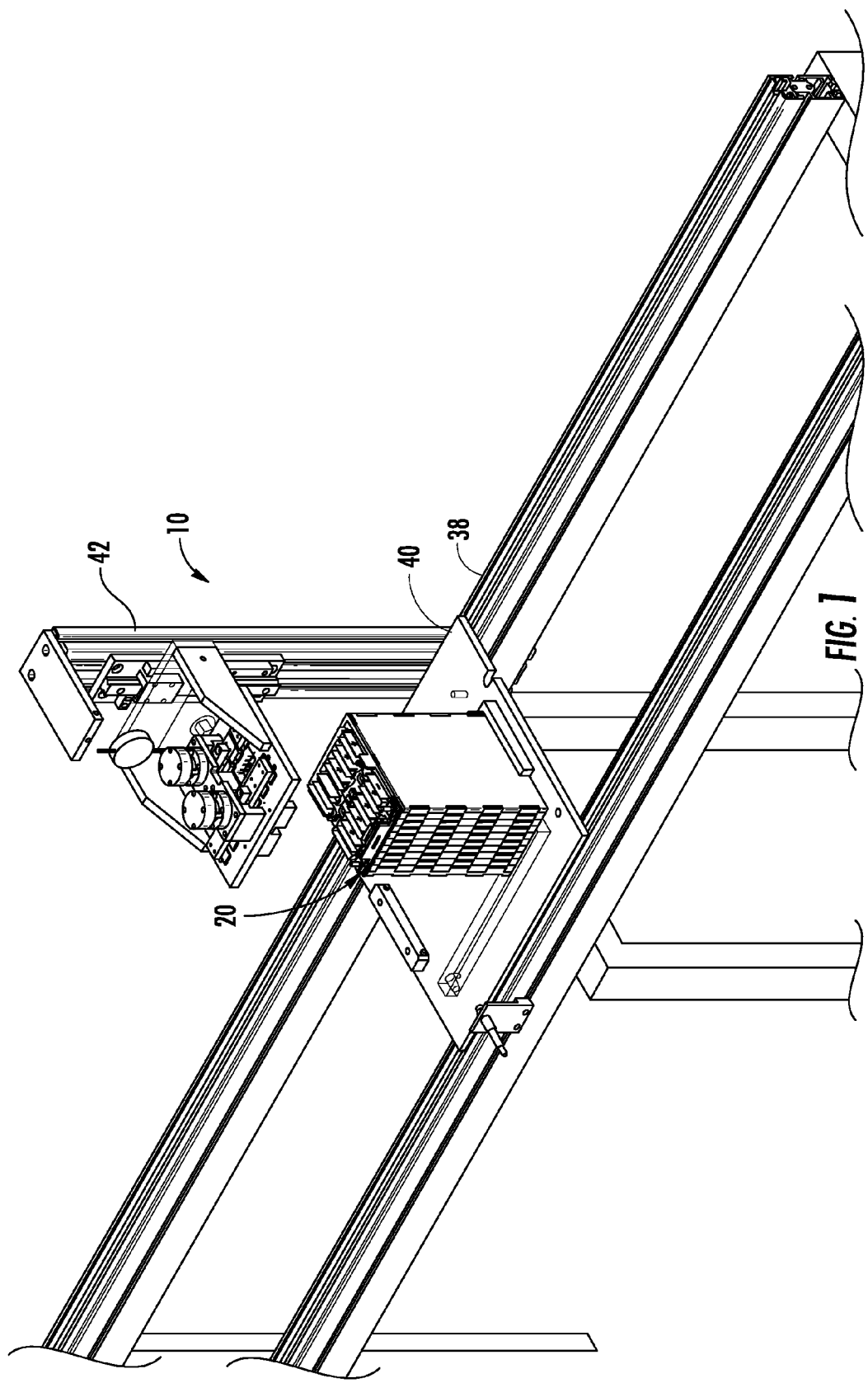
FIG. 1 is a schematic of a weld validation system in accordance with an exemplary embodiment and a battery module.
Figure 2:
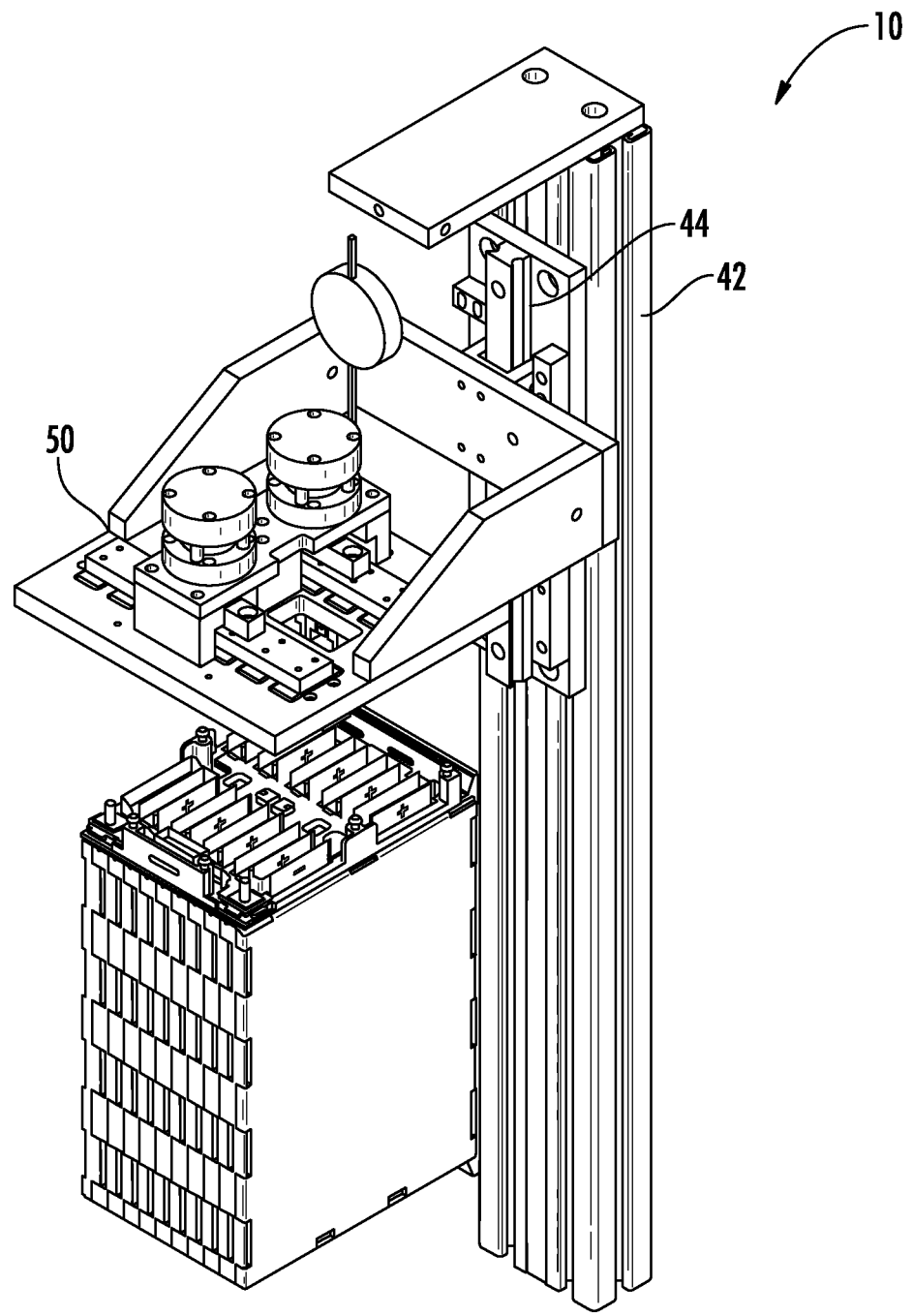
FIG. 2 is a schematic of a portion of the weld validation system of FIG. 1.
Figure 3:
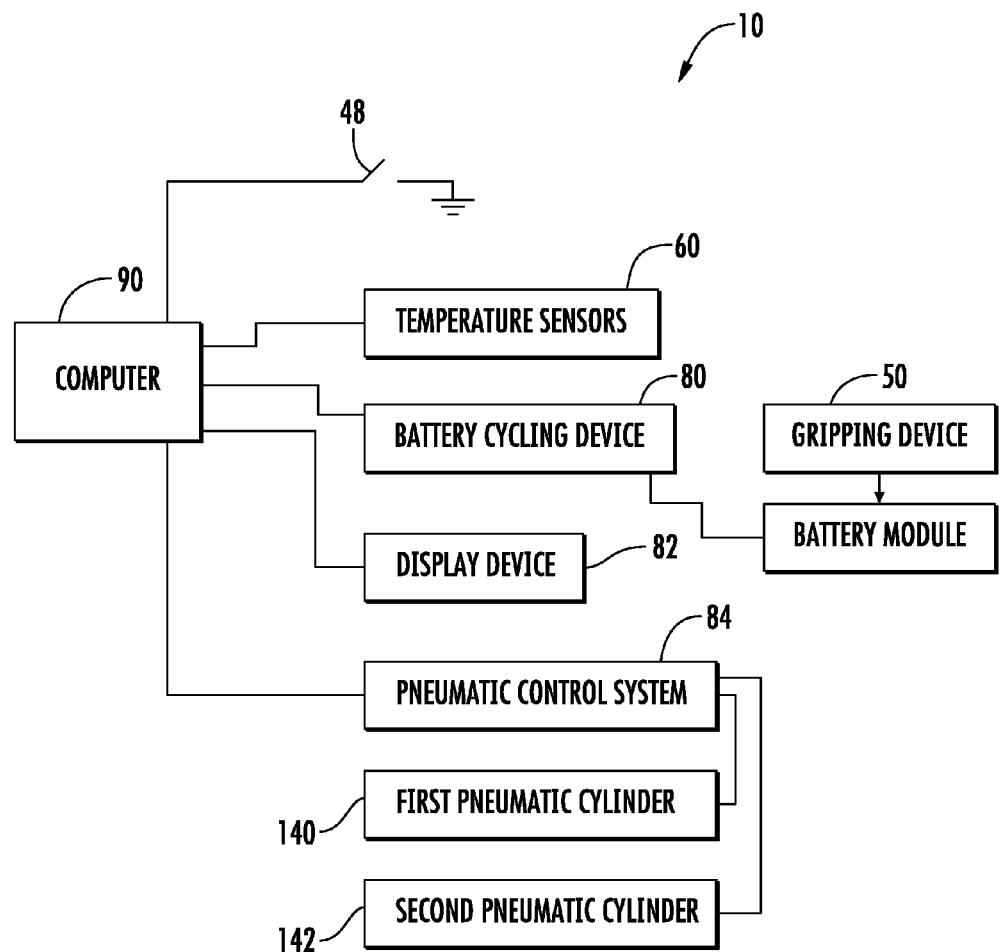
FIG. 3 is a block diagram of a portion of the weld validation system of FIG. 1.

Referring now to FIGS. 1-3, a weld validation system 10 that verifies whether weld joints in a battery module 20 has desired characteristics and is therefore validated in accordance with an exemplary embodiment is provided. An advantage of the weld validation system 10 is that the system monitors temperatures of interconnect members that are coupled to battery cell tabs in the battery module 21 when discharging the battery module 20 or charging the battery module 20. When discharging the battery module 20, if a temperature of the interconnect member coupled to battery cell tabs of the battery module 20 is less than or equal to a threshold temperature value, the weld joint between the interconnect member and the battery cell tab has desired structural characteristics. Similarly, when discharging the battery module 20, if a temperature of the interconnect member coupled to battery cell tabs of the battery module 20 is less than or equal to the threshold temperature value, the weld joint between the interconnect member and the battery cell tab has desired structural characteristics.

Figure 10:
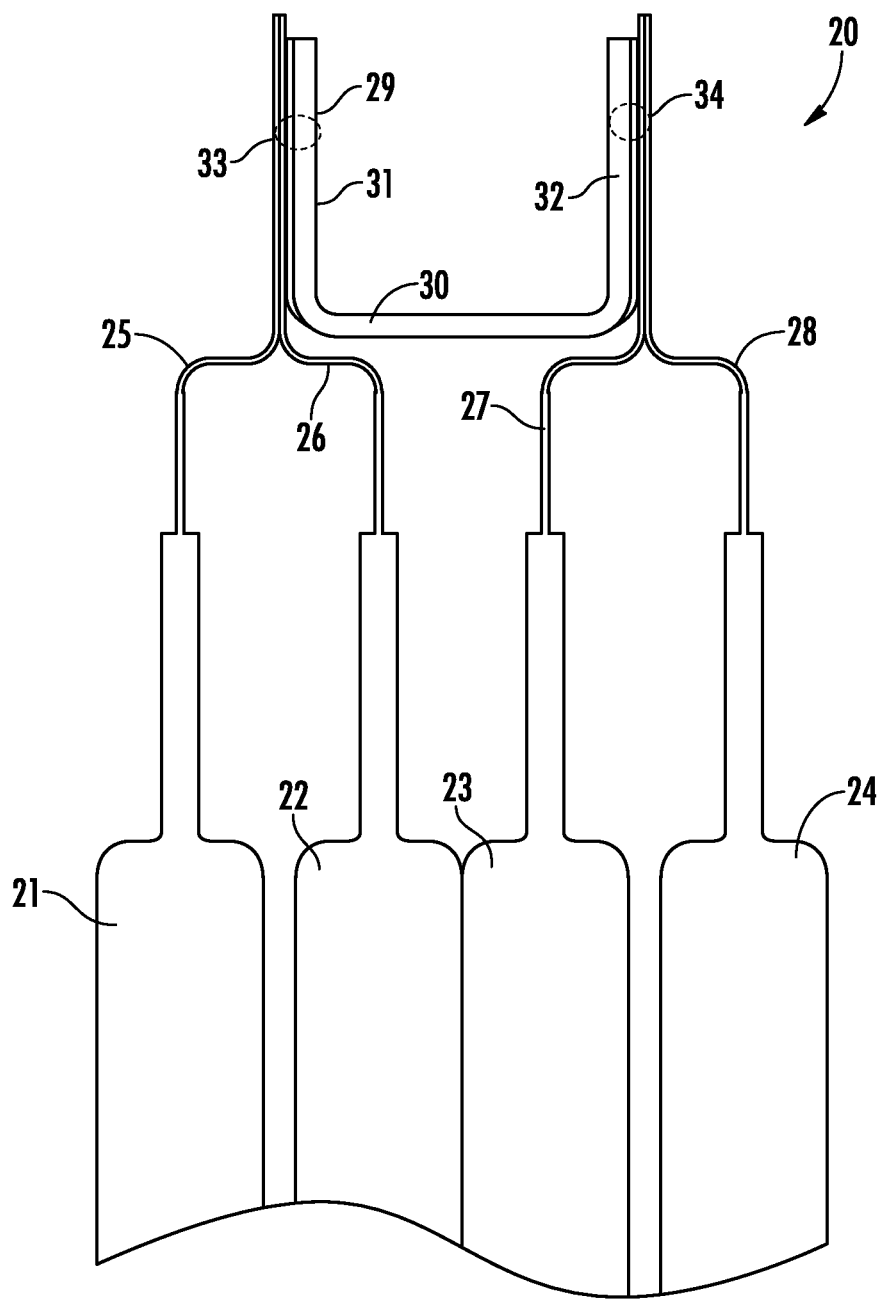
FIG. 10 is a schematic of battery cells and an interconnect member utilized in the battery module of FIG. 1.
Figure 11:
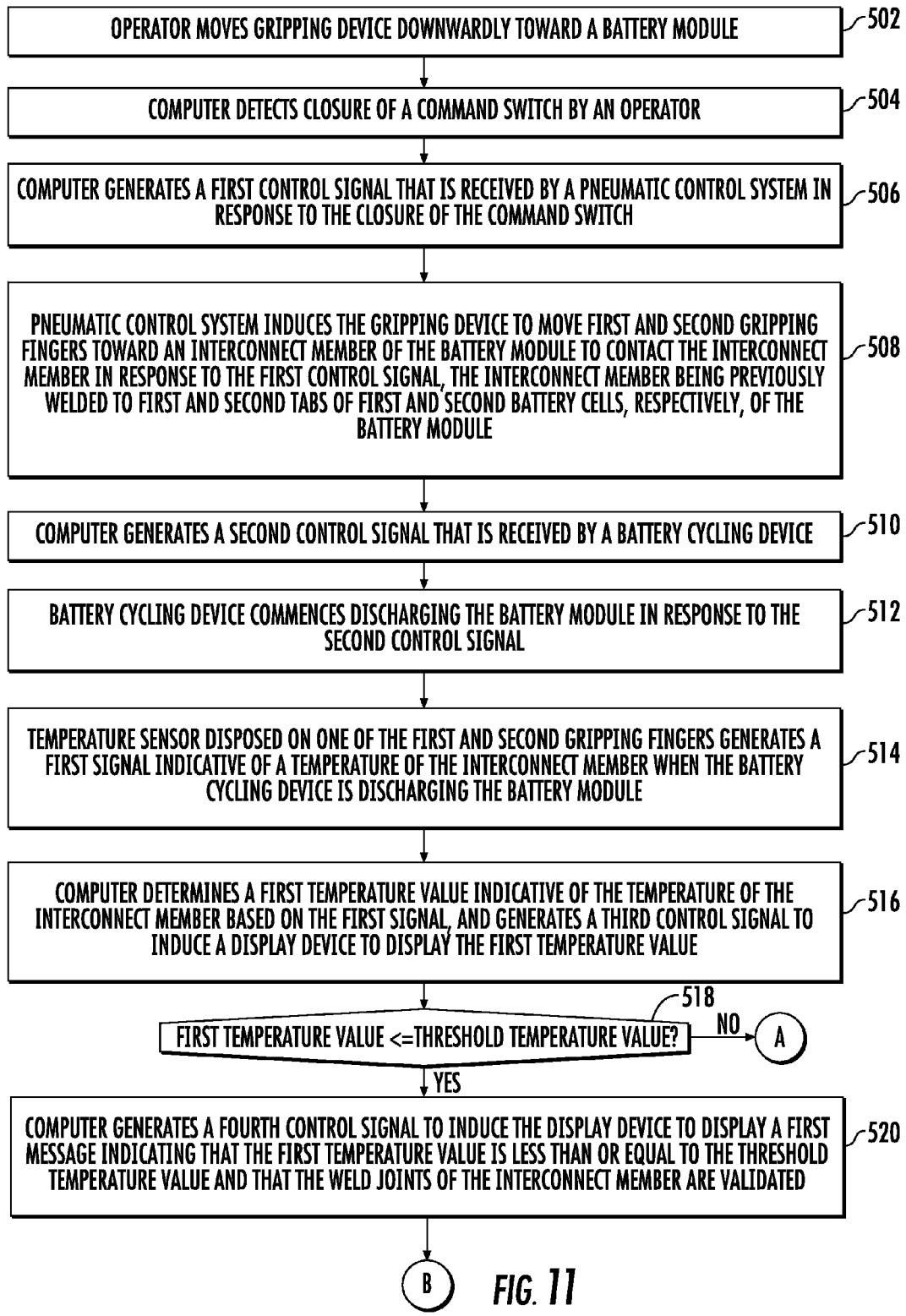
FIGS. 11 and 12 are flowcharts of a method for validating a weld joint of a battery module in accordance with another exemplary embodiment.
Figure 12:
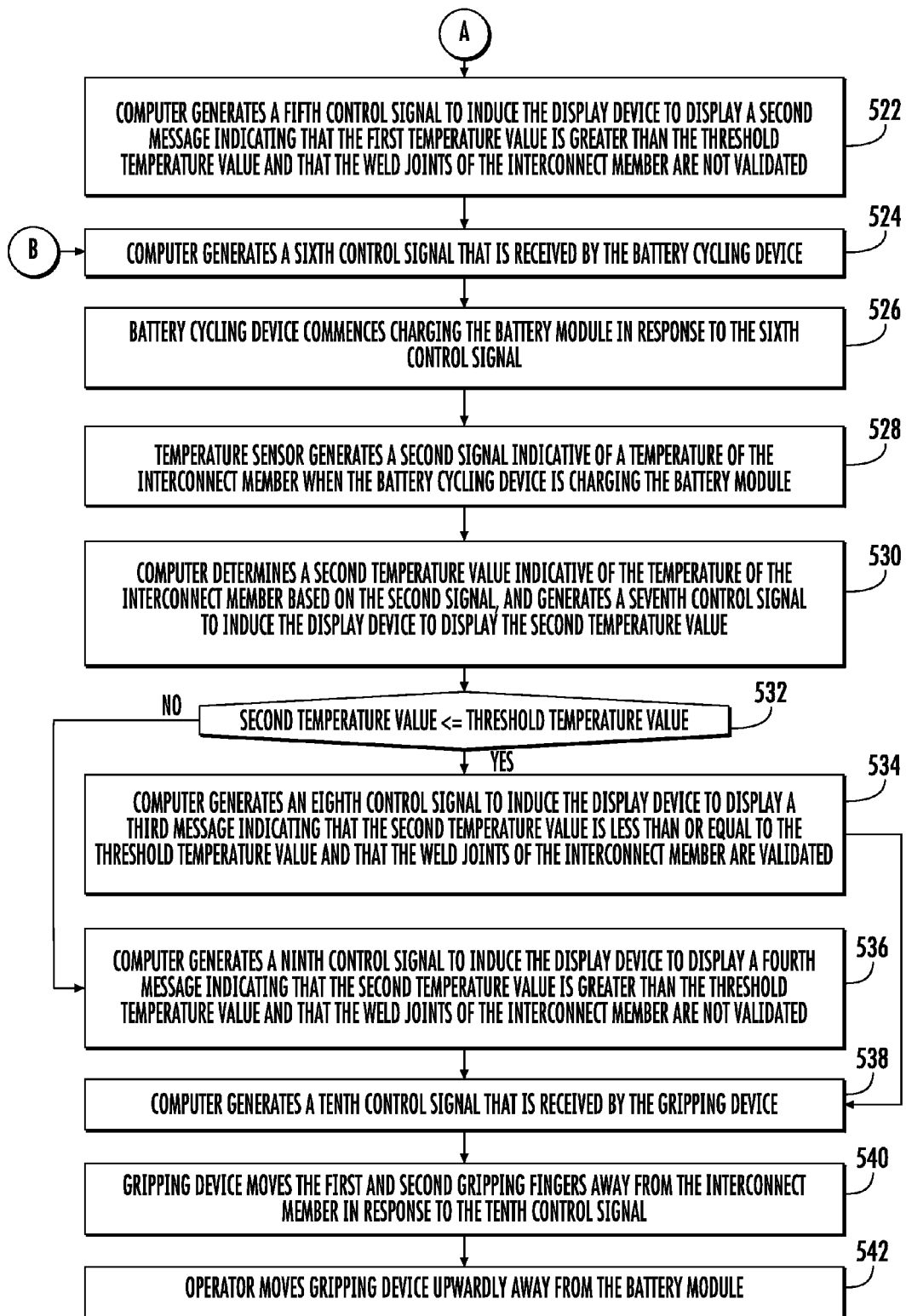

Referring to FIG. 10, the battery module 20 includes a plurality of battery cells including battery cells 21, 22, 23, 24 for example. Each of the battery cells has a pair of battery cell tabs extending therefrom. For example, the battery cell 21 has a battery cell tab 25 and another battery cell tab (not shown) extending therefrom, and the battery cell 22 has a battery cell tab 26 and another battery cell tab (not shown) extending therefrom. Also, for example, the battery cell 23 has a battery cell tab 27 and another battery cell tab (not shown) extending therefrom, and the battery cell 24 has a battery cell tab 28 and another battery cell tab (not shown) extending therefrom.

The battery module 20 further includes a plurality of interconnect members including the interconnect member 29 for example. The shape and configuration of the interconnect members can vary depending upon the desired battery module structure. In the illustrated embodiment, the interconnect member 29 has a substantially U-shaped cross-sectional profile having a bottom wall 30 coupled to side walls 31, 32 that extend substantially parallel to one another. When the battery cell tabs 25, 26 are welded to the wall 31, a weld joint 33 is formed in the tabs 25, 26 and the wall 31. Similarly, when the battery cell tabs 27, 28 are welded to the wall 32, a weld joint 34 is formed in the tabs 27, 28 and the wall 32.

The battery module 20 also includes first and second battery module terminals 36, 37 which are electrically coupled to the battery cells in the battery module 20.

Referring to FIGS. 1-3, the weld validation system 10 includes a conveyor 38, a pallet 40, a vertical support member 42, a lift assembly 44, a command switch 48, a gripping device 50, temperature sensors 60, a battery cycling device 80, a display device 82, a pneumatic control system 84, and a computer 90.

The conveyor system 38 is configured to support the pallet 40 thereon. The pallet 40 is configured to hold the battery module 20 thereon and to move longitudinally along the conveyor system 38. For testing the battery module 20, the pallet 40 can be disposed directly underneath the gripping device 50. Thereafter, the gripping device 50 can be lowered toward the battery module 20 such that the gripping device 50 contacts the battery module 20 to test the weld joints of the battery module 20. After testing of the battery module 20 is completed, the gripping device 50 is moved upwardly away from the battery module 20.

Figure 4:
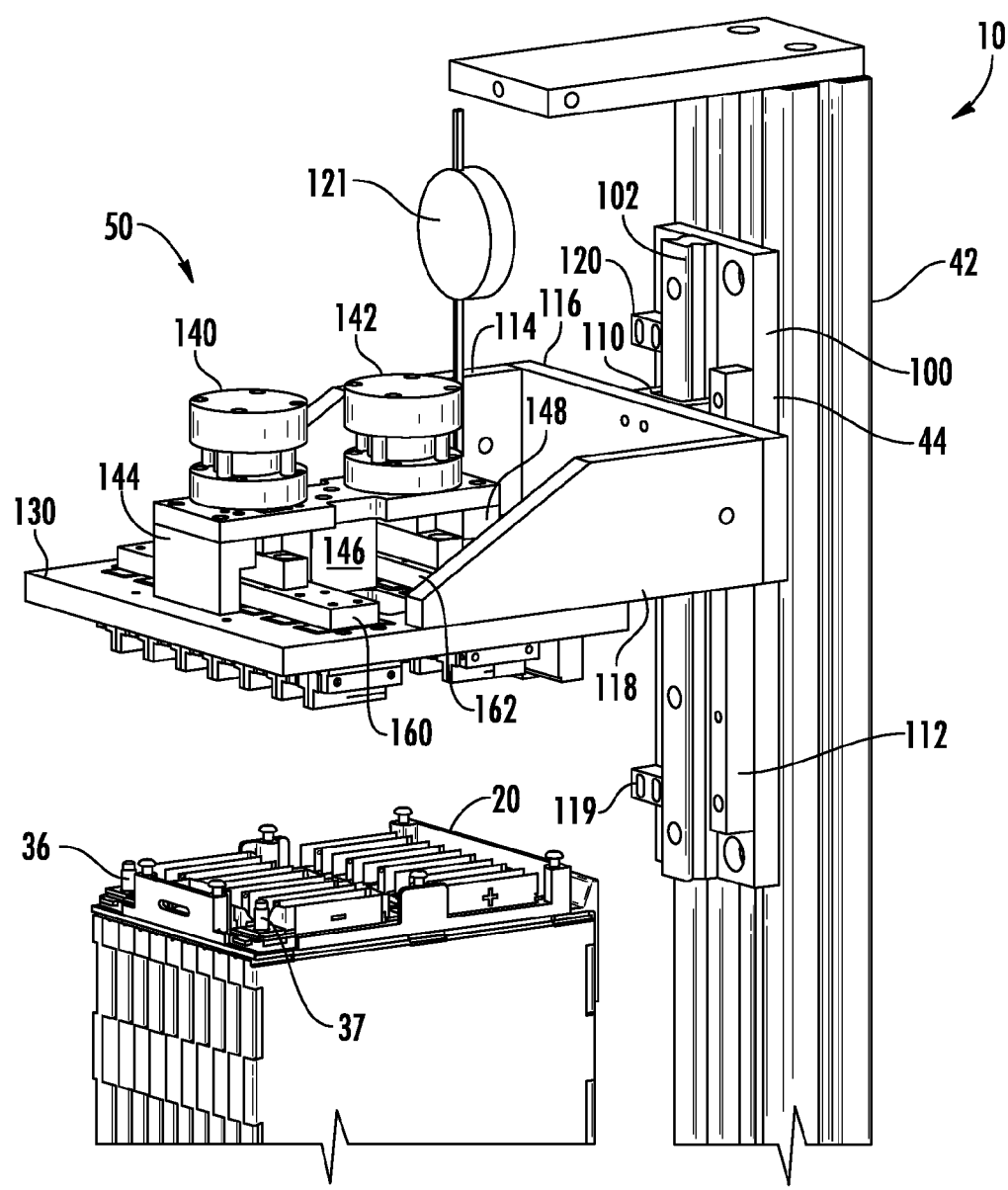
FIG. 4 is an enlarged schematic of a portion of the weld validation system of FIG. 1.
Figure 6:
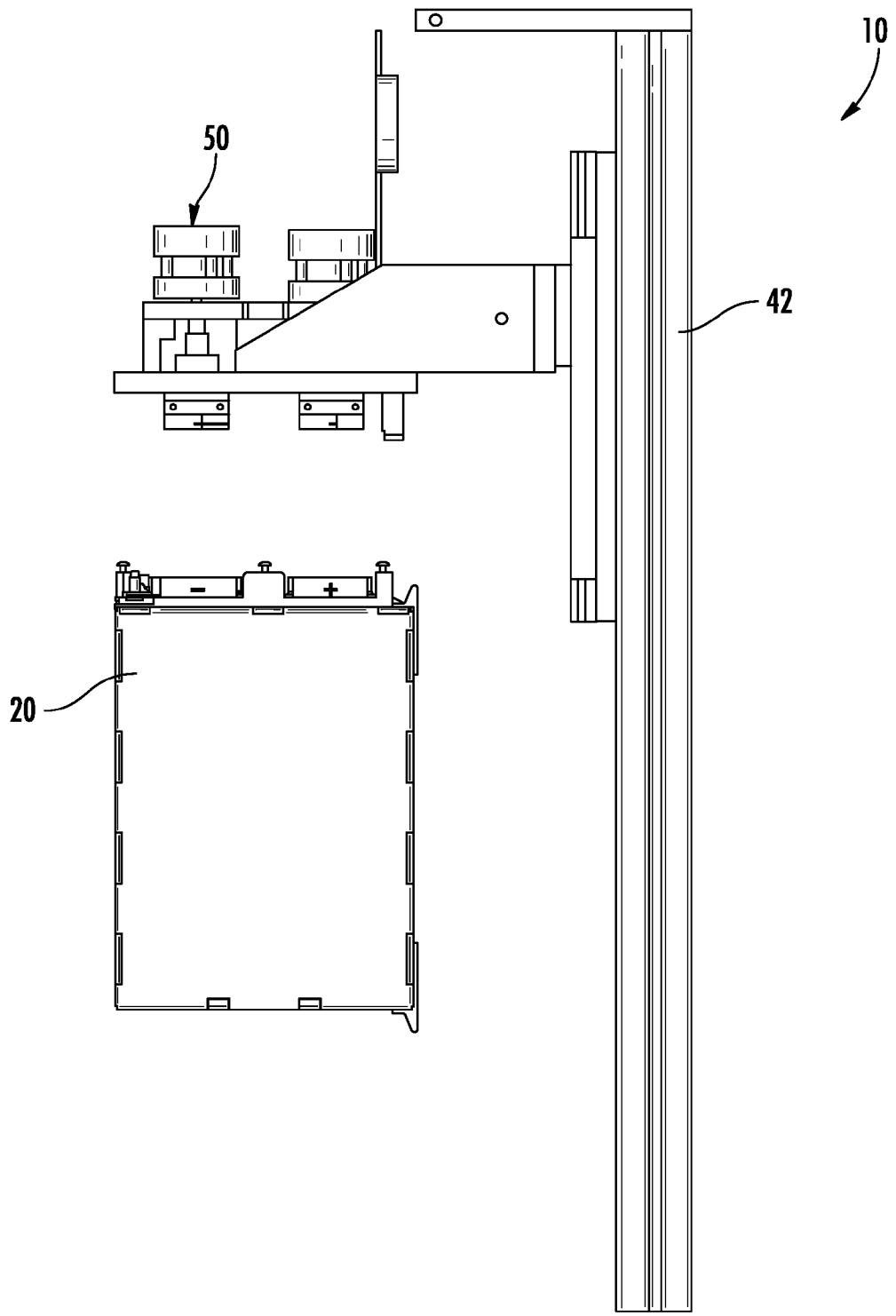
FIG. 6 is schematic of a side view of the weld validation system of FIG. 1.

Referring to FIGS. 2, 4 and 6, the vertical support 42 is coupled to the conveyor 38 and extends upwardly from the conveyor 38. The lift assembly 44 is operably coupled to the vertical support 42 to allow an operator to adjust a vertical position of the gripping device 50. The lift assembly 44 includes a plate 100, a rail 102, a linear bearing portion 110, a guide member 112, support walls 114, 116, 118, stopping members 119, 120, and a balance member 121. The plate 100 is coupled to a surface of the vertical support member 42 facing toward the pallet 40. The rail 102 and the guide member 112 are coupled to the plate 100. The rail 102 is operably coupled to the linear bearing portion 110 that is further coupled to the wall 116. The walls 114, 118 are coupled to opposite ends of the wall 114 and are further coupled to the gripping device 50. The linear bearing portion 110 moves vertically relative to the rail 102 for allowing an operator to adjust a vertical position of the gripping device 50. The balance member 121 is operably coupled to the wall 114 to assist an operator when raising the gripping device 50. The stopping members 119, 120 are utilized to define a lower vertical position and a upper vertical position, respectively, of the gripping device 50.

Referring to FIGS. 3-5 and 7, the gripping device 50 is configured to contact interconnect members of the battery module 20 for testing weld joints of the battery module 20. The gripping device 50 includes a plate 130, first and second pneumatic cylinders 140, 142, support blocks 144, 146, 148, movable plates 160, 162, movable arms 180, 182, 184, 186, 188, 190 and other movable arms (not shown), and gripping fingers 200, 202, 204, 206, 208, 210, 212, 214, 216, 218, 220, 222, 224, 226, 240, 242, 244, 246, 248, 250, 252, 254, 256, 258, 260, 262, support members 300, 302, 304, 306, 308, 310, 312, shafts 330, 331, and springs 340, 342, 344, 346, 348, 350 and other springs (not shown).

Referring to FIG. 4, the plate 130 is coupled to the walls 114, 118 of the lift assembly 44. The support blocks 144, 146, 148 are disposed on the top surface of the plate 130. The pneumatic cylinder 140 is disposed on portions of the support blocks 144, 146. Also, the pneumatic cylinder 142 is disposed on portions of the support blocks 146, 148.

Figure 7:
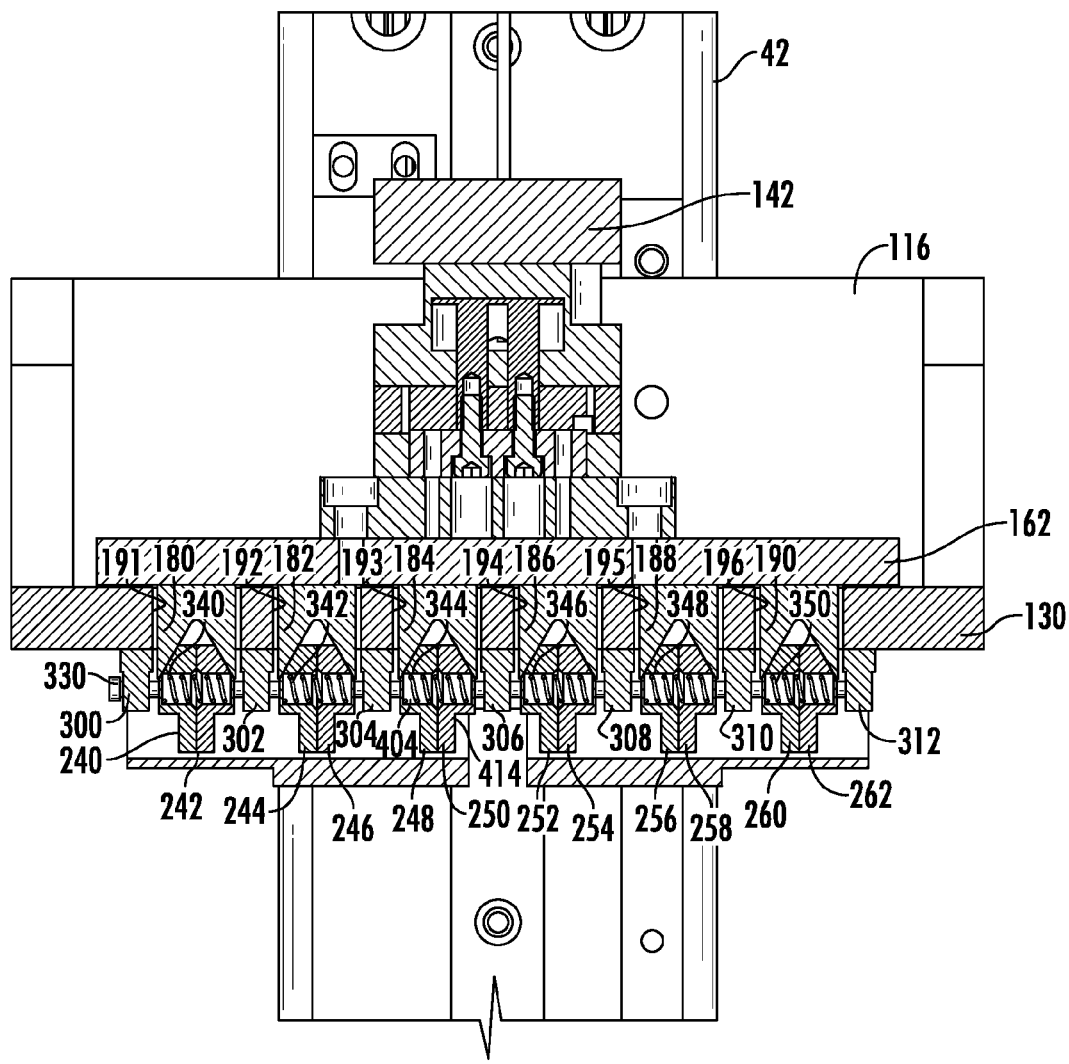
FIG. 7 is an enlarged schematic of a gripping device utilized in the weld validation system of FIG. 1.

Referring to FIG. 7, the pneumatic cylinder 142 has a shaft that is operably coupled to the moveable plate 162. The movable plate 162 is coupled to the movable arms 180, 182, 184, 186, 188, 190 that extend through apertures 191, 192, 193, 194, 195, 196, respectively, in the plate 130. The movable arms 180, 182, 184, 186, 188, 190 are configured to selectively engage the gripping fingers 240-262 as discussed in further detail below.

Figure 8:
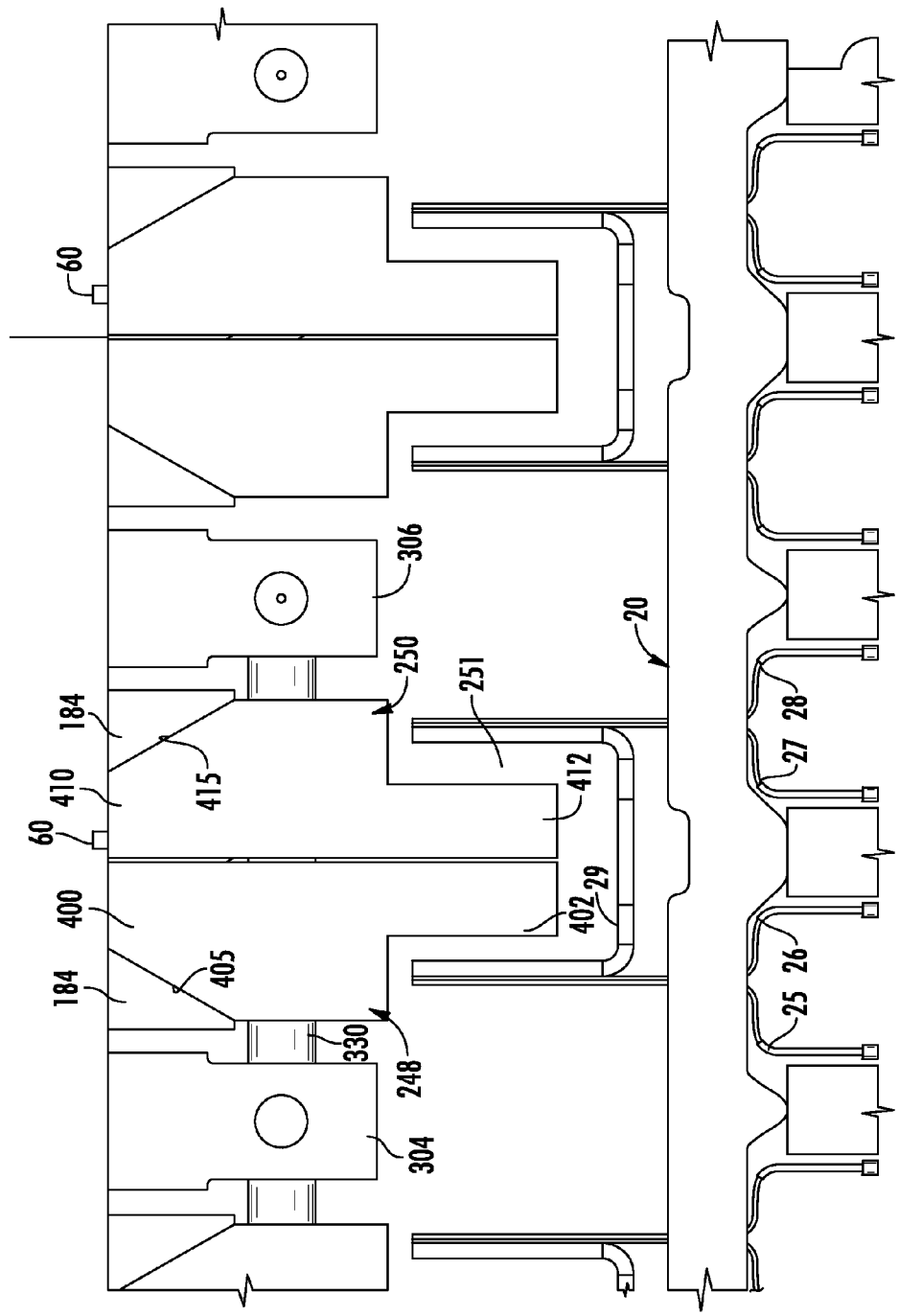
FIG. 8 is an enlarged schematic of a portion of the gripping device of FIG. 7 disposed proximate to a battery module.

When a shaft of the pneumatic cylinder 142 moves to a fully-extended operational position and the plate 162 moves to a fully-downward position, the movable arm 180 moves the gripping fingers 240, 242 adjacent to one another, and the movable arm 182 moves the gripping fingers 244, 245 adjacent to one another, and the movable arm 184 moves the gripping fingers 248, 250 adjacent to one another. Also, the movable arm 186 moves the gripping fingers 252, 254 adjacent to one another, and the movable arm 188 moves the gripping fingers 256, 258 adjacent to one another, and the movable arm 190 moves the gripping fingers 260, 262 adjacent to one another. Referring to FIG. 8, when respective pairs of the gripping fingers are moved adjacent to one another, each respective pair of gripping fingers can be received in an open region defined in a respective interconnect member. For example, when the gripping fingers 248, 250 are moved adjacent to one another, the gripping fingers 248, 250 can be received in an open region 251 defined by the interconnect member 29.

Figure 9:
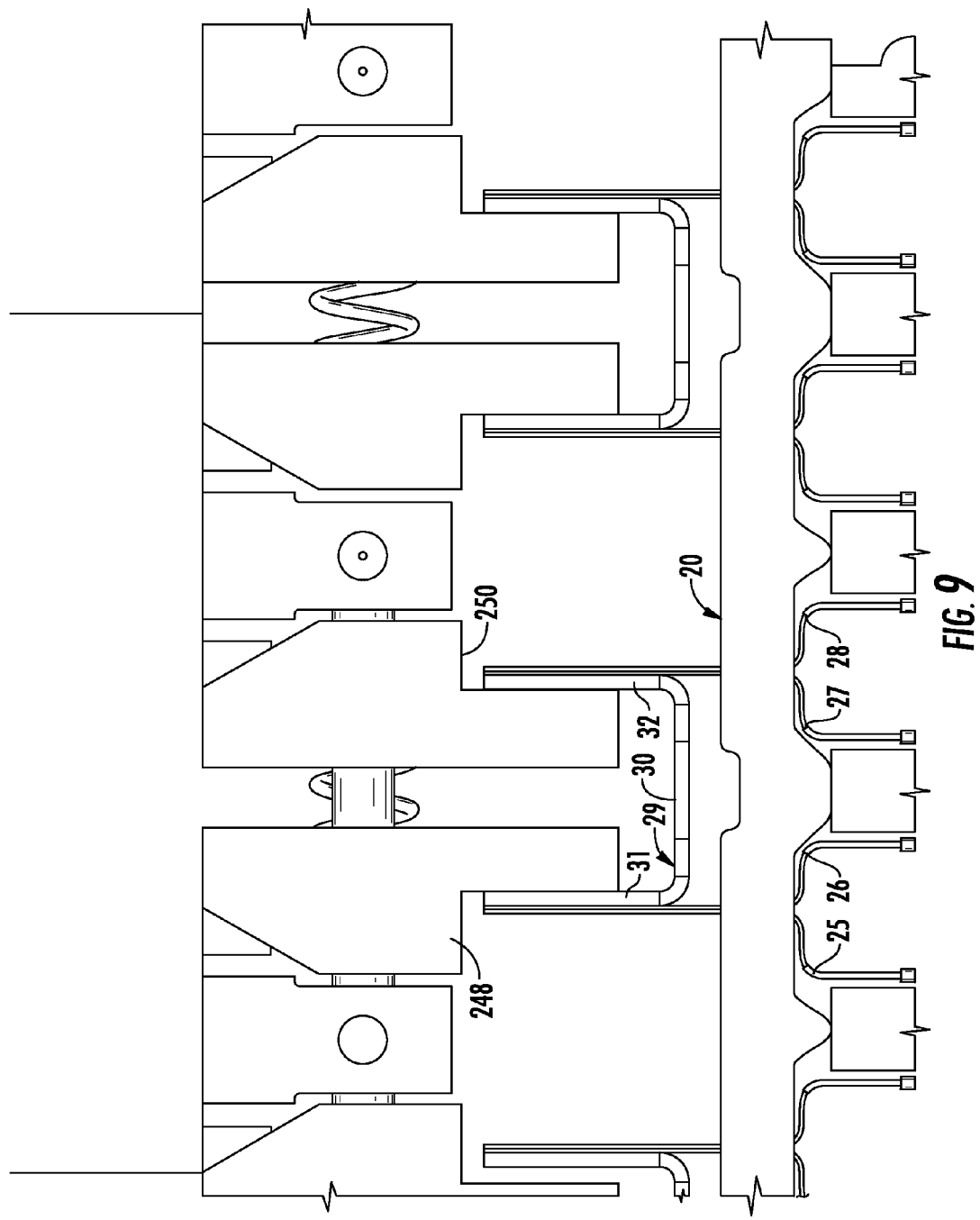
FIG. 9 is an enlarged schematic of a portion of the gripping device of FIG. 7 disposed proximate to a battery module.

Alternately, when a shaft of the pneumatic cylinder 142 moves to a fully-retracted operational position and the plate 162 moves to a fully-upward position, the movable arm 180 moves away from the gripping fingers 240, 242 to allow the gripping fingers 240, 242 to be biased by the spring 340 away from one another, and the movable arm 182 moves away from the gripping fingers 244, 246 to allow the gripping fingers 244, 246 to be biased by the spring 342 away from one another, and the movable arm 184 moves away from the gripping fingers 248, 250 to allow the gripping fingers 248, 250 to be biased by the spring 344 away from one another. Also, the movable arm 186 moves away from the gripping fingers 252, 254 to allow the gripping fingers 252, 254 to be biased by the spring 346 away from one another, and the movable arm 188 moves away from the gripping fingers 256, 258 to allow the gripping fingers 256, 258 to be biased by the spring 348 away from one another, and the movable arm 190 moves away from the gripping fingers 260, 262, to allow the gripping fingers 260, 262 to be biased by the spring 350 away from one another. Referring to FIG. 9, when respective pairs of the gripping fingers are spring-biased away from one another, each respective pair of gripping fingers contact opposite walls in respective interconnect members. For example, when the gripping fingers 248, 250 are biased by the spring 344 away from one another, the gripping fingers 248, 250 contact walls 31, 32, respectively, of the interconnect member 29. Because each pair of gripping fingers are spring loaded, the assembly compensates for misalignment of the interconnect members. Thus, each pair of gripping fingers self-centers on a respective interconnect member and provides an equal amount of force (e.g., 4 lbs) on the interconnect member.

Referring to FIGS. 7 and 8, since each pair of gripping fingers have a similar structure, only the pair of gripping fingers 248, 250 will be explained in greater detail below. The gripping finger 248 includes a body portion 400 and a tip portion 402 that extends from the body portion 400. The body portion 400 has an aperture 404 and another aperture extending therethrough for receiving the shafts 330, 331 therethrough. Also, the body portion 400 includes a tapered surface 405 for contacting a portion of the movable member 184. The gripping finger 250 includes a body portion 410 and a tip portion 412 that extends from the body portion 410. The body portion 410 has an aperture 414 and another aperture extending therethrough for receiving the shafts 330, 331 therethrough. Also, the body portion 410 includes a tapered surface 415 for contacting a portion of the movable member 184. As shown, the spring 346 is disposed in adjacent recesses in the body portions 400, 410 and biases the gripping fingers 248, 250 away from each other.

Referring to FIG. 7, the support members 300, 302, 304, 306, 308, 310, 312 are coupled to the plate 130. The gripping fingers 240, 242 are disposed between support members 300, 302, and the gripping fingers 244, 246 are disposed between the gripping members 302, 304. Also, the gripping fingers 248, 250 are disposed between the support members 304, 306. Further, the gripping fingers 252, 254 are disposed between the support members 306, 308, and the gripping fingers 256, 258 are disposed between the support members 308, 310. The gripping fingers 260, 262 are disposed between the support members 310, 312. The shafts 330, 331 extend through apertures in the support members 300-312 and the gripping fingers 240-262 to support the gripping fingers 240-262 thereon.

Figure 5:
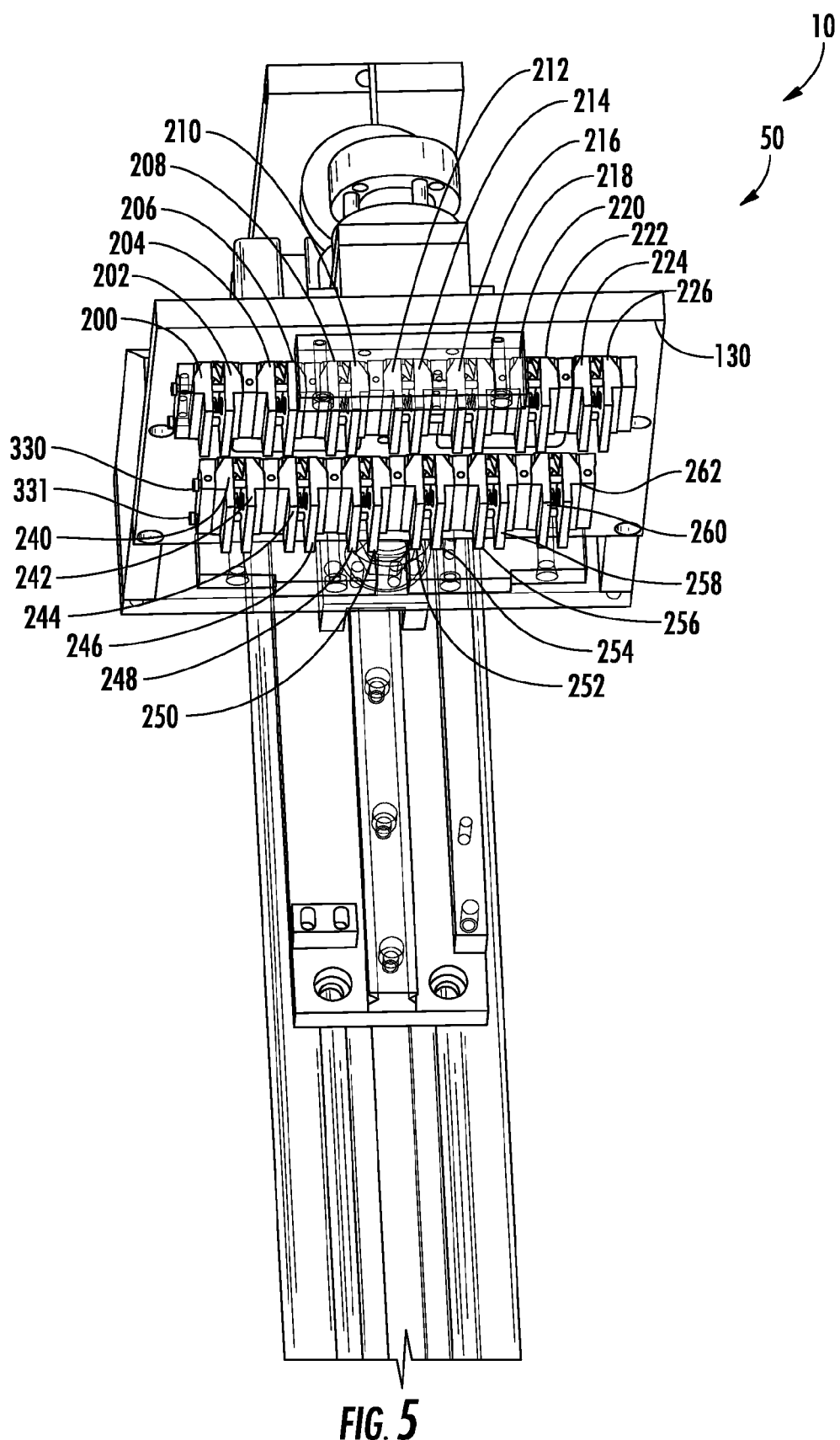
FIG. 5 is schematic of a portion of the weld validation system of FIG. 1.

Referring to FIGS. 4 and 5, the pneumatic cylinder 140 has a shaft that is operably coupled to the moveable plate 160. The movable plate 160 is coupled to a plurality of movable arms (not shown) that extend through apertures in the plate 130. The plurality of movable arms are configured to selectively engage the gripping fingers 200-226.

When the shaft of the pneumatic cylinder 140 moves to a fully-extended operational position and the plate 160 moves to a fully-downward operational position, the respective plurality of movable arms moves respective pairs of gripping fingers adjacent to one another to be received in respective open regions of respective interconnect members.

When the shaft of the pneumatic cylinder 140 moves to a fully-retracted operational position and the plate 160 moves to a fully-upward operational position, the respective movable arms move away from respective pairs of gripping fingers 200-226 to allow the respective pairs of gripping fingers 200-226 to be biased by respective springs away from one another. When respective pairs of the gripping fingers 200-226 are spring-biased away from one another, each respective pair of gripping fingers 200-226 contact opposite walls in respective interconnect members of the battery module 20.

Referring to FIGS. 3 and 8, the temperature sensors 60 are configured to generate signals indicative of temperatures of interconnect members of the battery module 20 that are received by the computer 90. In particular, each respective pair of gripping fingers has a temperature sensor 60 coupled to a least one of the gripping fingers. For example, referring to FIG. 8, the temperature sensor 60 is operably coupled to the gripping finger 250 and generates a signal indicative of a temperature of the interconnect member 29.

Referring to FIGS. 3 and 4, the battery cycling device 80 is electrically coupled to the first and second battery module terminals 36, 37 of the battery module 20, via electrical connectors, for charging and discharging the battery module 20. Also, the battery cycling device 80 is operably coupled to the computer 90. The battery cycling device 80 is configured to discharge the battery module 20 in response to a control signal from the computer 90. Also, the battery cycling device 80 is configured to charge of the battery module 20 in response to another control signal from the computer 90.

The display device 82 is operably coupled to the computer 90. The display device 82 is configured to display data including temperature values and associated messages in response to control signals from the computer 90 as will be described in greater detail below.

The pneumatic control system 84 is configured to apply pressurized air to the first and second pneumatic cylinders 140, 142 in response to a control signal from the computer 90 to induce the first and second pneumatic cylinders 140, 142 to extend respective shafts thereof. Further, the pneumatic control system 84 is configured to remove the pressurized air from the first and second pneumatic cylinders 140, 142 in response to the control signal no longer being output by the computer 90 to induce the first and second pneumatic cylinders 140, 142 to retract respective shafts thereof.

The computer 90 is configured to control operation of the weld validation system 10 as will be explained in greater detail below. The computer 90 is operably coupled to the command switch 48, the temperature sensors 60, the battery cycling device 80, the display device 82, and the pneumatic control system 84.

For purposes of understanding, it should be understood that the weld validation system 10 can validate a plurality of weld joints on the battery module 20. However, for purposes of simplicity, the following method will be explained for validating weld joints within a single interconnect member and battery cell tabs, of the battery module 20.

Referring to FIGS. 1, 3, 4 and 11-12, a flowchart of a method for validating a weld joint of the battery module 20 in accordance with another exemplary embodiment will be explained.

At step 502, an operator electrically couples the battery cycling device 80 to the first and second battery module terminals 36, 37 of the battery module 20, and moves the gripping device 50 downwardly toward the battery module 20.

At step 504, the computer 90 detects closure of the command switch 48 by the operator.

At step 506, the computer 90 generates a first control signal that is received by pneumatic control system 84 in response to the closure of the command switch 48.

At step 508, the pneumatic control system 84 induces the gripping device 50 to move first and second gripping fingers 248, 250 toward the interconnect member 29 of the battery module 20 to contact the interconnect member 29 in response to the first control signal. The interconnect member 29 was previously welded to first and second tabs 26, 27 of first and second battery cells 22, 23, respectively, (shown in FIG. 10) of the battery module 20.

At step 510, the computer 90 generates a second control signal that is received by the battery cycling device 80.

At step 512, the battery cycling device 80 commences discharging the battery module 20 in response to the second control signal.

At step 514, the temperature sensor 60 disposed on one of the first and second gripping fingers 248, 250 generates a first signal indicative of a temperature of the interconnect member 29 when the battery cycling device 80 is discharging the battery module 20.

At step 516, the computer 90 determines a first temperature value indicative of the temperature of the interconnect member 29 based on the first signal, and generates a third control signal to induce the display device 82 to display the first temperature value.

At step 518, the computer 90 makes a determination as to whether the first temperature value is less than or equal to a threshold temperature value. In one exemplary embodiment, the threshold temperature value is 45° Celsius. Of course, in an alternative embodiment, the threshold temperature value could be less than 45° Celsius or greater than 45° Celsius. If the value of step 518 equals "yes", the method advances to step 520. Otherwise, the method advances to step 522.

At step 520, the computer 90 generates a fourth control signal to induce the display device 82 to display a first message indicating that the first temperature value is less than or equal to the threshold temperature value and that the weld joints of the interconnect member are validated. After step 520, the method advances to step 524.

Referring again to step 518, if the value of step 518 equals "no", the method advances to step 522. At step 522, the computer 90 generates a fifth control signal to induce the display device 82 to display a second message indicating that the first temperature value is greater than the threshold temperature value and that the weld joints of the interconnect member are not validated. After step 522, the method advances to step 524.

At step 524, the computer 90 generates a sixth control signal that is received by the battery cycling device 80.

At step 526, the battery cycling device 80 commences charging the battery module 20 in response to the sixth control signal.

At step 528, the temperature sensor 60 generate a second signal indicative of a temperature of the interconnect member 29 when the battery cycling device 80 is charging the battery module 20.

At step 530, the computer 90 determines a second temperature value indicative of the temperature of the interconnect member 29 based on the second signal, and generates a seventh control signal to induce the display device 82 to display the second temperature value.

At step 532, the computer 90 makes a determination as to whether the second temperature value is less than or equal to the threshold temperature value. If the value of step 532 equals "yes", the method advances to step 534. Otherwise, the method advances to step 536.

At step 534, the computer 90 generates an eighth control signal to induce the display device 82 to display a third message indicating that the second temperature value is less than or equal to the threshold temperature value and that the weld joints of the interconnect member are validated. After step 534, the method advances to step 538.

Referring again to step 532, if the value of step 532 equals "no", the method advances to step 536. At step 536, the computer 90 generates a ninth control signal to induce the display device 82 to display a fourth message indicating that the second temperature value is greater than the threshold temperature value and that the weld joints of the interconnect member are not validated. After step 536, the method advances to step 538.

At step 538, the computer 90 generates a tenth control signal that is received by the gripping device 50.

At step 540, the gripping device 50 moves the first and second gripping fingers 248, 250 away from the interconnect member 29 in response to the tenth control signal.

At step 542, the operator moves gripping device 50 upwardly away from the battery module 20.

The weld validation system and the method for validating a weld joint of the battery module 20 provide a substantial advantage over other systems and methods. In particular, weld validation system and method provides a technical effect of utilizing a gripping device to contact interconnect members for measuring temperatures of the interconnect members while discharging or charging the battery module where the temperatures are indicative of whether the weld joints have desired structural and functional characteristics.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

We claim:

1. A weld validation system for a battery module, the battery module having first and second battery cells and an interconnect member welded to first and second tabs of the first and second battery cells, respectively, comprising:
    a gripping device having first and second gripping fingers contacting the interconnect member;
    a battery cycling device being electrically coupled to the battery module that charges and discharges the battery module when the first and second gripping fingers are contacting the interconnect member;
    a temperature sensor disposed on one of the first and second gripping fingers that generates a first signal indicative of a temperature of the interconnect member when the battery cycling device is discharging the battery module;
    a computer programmed to determine a first temperature value indicative of the temperature of the interconnect member based on the first signal;
    the computer further programmed to determine if the first temperature value is less than or equal to a threshold temperature value; and
    the computer further programmed to generate a first control signal to induce a display device to display a first message indicating weld joints of the interconnect member are validated if the first temperature value is less than or equal to the threshold temperature value when the battery cycling device is discharging the battery module.

2. The weld validation system of claim 1, wherein the first gripping finger has a first body portion and a first tip portion and a first aperture extending through the first body portion, the first body portion and the first tip portion defining a first flat surface, and the second gripping finger has a second body portion and a second tip portion and a second aperture extending through the second body portion, the second body portion and the second tip portion defining a second flat surface which is disposed substantially parallel to the first flat surface, the first flat surface facing the second flat surface, the gripping device further comprising:
    first and second support members disposed proximate to the first and second gripping fingers, respectively;
    a shaft disposed through the first and second apertures and coupled to the first and second support members;
    a spring disposed between and within portions of the first and second gripping fingers to bias the first and second flat surfaces that are substantially parallel to one another away from one another;
    a movable member slidably disposed on first and second outer surfaces of the first and second finger portions, respectively, that moves in a first direction to move the first and second flat surfaces that are substantially parallel to one another toward one another;
    the movable member slidably disposed on the first and second outer surfaces of the first and second finger portions, respectively, that moves in a second direction to allow the spring to bias the first and second flat surfaces that are substantially parallel to one another away from one another, the second direction being opposite to the first direction.

3. The weld validation system of claim 1, wherein the computer is further programmed to induce the display device to display the first temperature value.

4. The weld validation system of claim 1, wherein:
the temperature sensor generating a second signal indicative of a temperature of the interconnect member when the battery cycling device is charging the battery module;
the computer being further programmed to determine a second temperature value indicative of the temperature of the interconnect member based on the second signal;
the computer further programmed to determine if the second temperature value is less than or equal to the threshold temperature value; and
the computer further programmed to generate a second control signal to induce the display device to display a second message indicating the weld joints of the interconnect member are validated if the second temperature value is less than or equal to the threshold temperature value when the battery cycling device is charging the battery module.

5. The weld validation system of claim 4, wherein the computer is further programmed to induce the display device to display the second temperature value.

6. The weld validation system of claim 2, wherein the first and second body portions are configured to move axially along the shaft.

7. The weld validation system of claim 1, wherein the first gripping finger has a first body portion and a first tip portion and a first aperture extending through the first body portion, and the second gripping finger has a second body portion and second tip portion and a second aperture extending through the second body portion.

8. The weld validation system of claim 7, wherein the first tip portion and the second tip portion are disposed against one another in a first operational position, the first tip portion and the second tip portion being disposed away from one another in a second operational position.

9. The weld validation system of claim 7, further comprising a shaft that extends through the first and second apertures of the first and second body portions, respectively, the first and second body portions being configured to move axially along the shaft.

10. A weld validation system for a battery module, the battery module having first and second battery cells and an interconnect member welded to first and second tabs of the first and second battery cells, respectively, comprising:
a gripping device having first and second gripping fingers configured to contact the interconnect member; the first gripping finger having a first body portion and a first tip portion and a first aperture extending through the first body portion, the first body portion and the first tip portion defining a first flat surface: the second gripping finger having a second body portion and a second tip portion and a second aperture extending through the second body portion, the second body portion and the second tip portion defining a second flat surface which is disposed substantially parallel to the first flat surface, the first flat surface facing the second flat surface, the gripping device further comprising:
first and second support members disposed proximate to the first and second gripping fingers, respectively;
a shaft disposed through the first and second apertures and coupled to the first and second support members;
a spring disposed between and within portions of the first and second gripping fingers to bias the first and second flat surfaces that are substantially parallel to one another away from one another;
a movable member slidably disposed on first and second outer surfaces of the first and second finger portions, respectively, that moves in a first direction to move the first and second flat surfaces that are substantially parallel to one another toward one another;
the movable member slidably disposed on the first and second outer surfaces of the first and second finger portions, respectively, that moves in a second direction to allow the spring to bias the first and second flat surfaces that are substantially parallel to one another away from one another, the second direction being opposite to the first direction;
a battery cycling device being electrically coupled to the battery module to charge and discharge the battery module when the first and second flat surfaces are at a first operational position such that the first and second gripping fingers contact the interconnect member;
a temperature sensor disposed on the first gripping finger to generate a first signal indicative of a temperature of the interconnect member when the first and second gripping fingers are contacting the interconnect member and the battery cycling device is discharging the battery module;
a computer programmed to determine a first temperature value indicative of the temperature of the interconnect member based on the first signal;
the computer further programmed to determine if the first temperature value is less than or equal to a threshold temperature value; and
the computer further programmed to generate a control signal indicating weld joints of the interconnect member are validated if the first temperature value is less than or equal to the threshold temperature value when the battery cycling device is discharging the battery module.

11. The weld validation system of claim 10, wherein the first and second surfaces of the first and second gripping fingers, respectively, are first and second tapered surfaces, respectively.

12. The weld validation system of claim 11, wherein the movable member has a wedge-shaped inner surface that contacts the first and second tapered surfaces.

13. The weld validation system of claim 11, wherein the temperature of the interconnect member indicates a validity of weld joints of the interconnect member.

* * * * *